(12) United States Patent
Yoshihara et al.

(10) Patent No.: US 6,706,136 B2
(45) Date of Patent: Mar. 16, 2004

(54) RESIN COMPOSITION FOR HIGH-FREQUENCY BONDING

(75) Inventors: Nori Yoshihara, Ohtsu (JP); Akira Taniguchi, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/269,677

(22) Filed: Oct. 11, 2002

(65) Prior Publication Data

US 2003/0109658 A1 Jun. 12, 2003

(30) Foreign Application Priority Data

Oct. 16, 2001 (JP) ........................................ 2001-318174
Sep. 20, 2002 (JP) ........................................ 2002-275645

(51) Int. Cl.$^7$ ............................................. B32B 31/00
(52) U.S. Cl. ..................... 156/273.9; 526/348; 528/272; 528/310
(58) Field of Search ...................... 156/273.9; 526/348; 528/272, 310

(56) References Cited

U.S. PATENT DOCUMENTS

| | | | | |
|---|---|---|---|---|
| 4,661,299 A | * | 4/1987 | Thorsrud | ..................... 264/491 |
| 4,840,758 A | | 6/1989 | Thorsrud | |
| 6,348,119 B1 | * | 2/2002 | Leonte et al. | ............ 156/273.9 |
| 2003/0144420 A1 | * | 7/2003 | Tsumura et al. | ............ 525/100 |

FOREIGN PATENT DOCUMENTS

| | | | |
|---|---|---|---|
| EP | 0688821 | * | 12/1995 |
| EP | 0 688 821 A2 | | 12/1995 |
| JP | 52-68273 A | | 12/1975 |
| JP | 54161645 | * | 12/1979 |
| JP | 54-161645 A | | 12/1979 |
| JP | 56-075824 A | | 6/1981 |
| JP | 59-015572 A | | 1/1984 |
| JP | 59-026576 A | | 2/1984 |
| JP | 59-184611 A | | 10/1984 |
| JP | 60130664 | * | 7/1985 |
| JP | 60-130664 A | | 7/1985 |
| JP | 62-050122 A | | 3/1987 |
| JP | 62132983 | * | 6/1987 |
| JP | 62-132983 A | | 6/1987 |
| JP | 02-129243 A | | 5/1990 |
| JP | 02-182419 A | | 7/1990 |
| JP | 05-042982 B2 | | 6/1993 |
| JP | 06-182876 A | | 7/1994 |
| JP | 06-228368 A | | 8/1994 |
| JP | 08-193150 A | | 7/1996 |
| JP | 10-273568 A | | 10/1998 |

OTHER PUBLICATIONS

Nguyen et al., "Faster Processing of Ultra High Molecular Weight Polyethylene Using an Inorganic Sensitizer and High Frequency Heating," *ANTEC Conference Proceedings*, pp. 2245–2247 (1991).

* cited by examiner

*Primary Examiner*—David W. Wu
*Assistant Examiner*—Henry S. Hu
(74) *Attorney, Agent, or Firm*—Leydig, Voit & Mayer, Ltd.

(57) ABSTRACT

A resin composition for high-frequency bonding with a dielectric loss tangent of 0.03 or higher at a frequency of 40 MHz, containing a thermoplastic resin having a melting point of 80° C. to 200° C. in an amount of 70% to 99% by volume, based on the total volume of the composition, and a conductive material having a volume resistivity of $10^{-2}$ Ω.cm or lower in an amount of 30% to 1% by volume, based on the total volume of the composition.

8 Claims, 2 Drawing Sheets

RESIN COMPOSITION FOR HIGH-FREQUENCY BONDING

FIELD OF INVENTION

The present invention relates to a resin composition for bonding the same or different materials selected from glass, ceramic, metals, resins, and the like. More particularly, the present invention relates to a resin composition for high-frequency bonding, which makes possible bonding for a short time by high-frequency heating, without using a heating furnace, and which exhibits high bonding strength even at high temperatures around 50° C.

BACKGROUND OF THE INVENTION

In recent years, since adhesives have remarkably improved performance and function, they have been used in many fields including electric, machinery, civil engineering, architecture, wood, paper, fibers, and chemistry. Adhesives have also been used for the connection of important constituent parts. For example, adhesives have been used even for the portions which are required to have high reliability, such as bonding between break linings of automobiles and honeycomb structural members of airplanes.

Compared with the connection with screws, bolts, nails, welding, or the like, the connection with adhesives has the advantages that the production process can be simplified and the connected portions can be lightened.

When the same or different materials selected from glass, ceramic, metals, resins, and the like, such as used in the fields including automobiles, railroad vehicles, airplanes, and civil engineering works and buildings, are bonded, a primer is often applied to the surface of materials to be bonded prior to the application of an adhesive, in order to improve the adhesion and durability of connection, and after drying and/or curing the primer, an adhesive is applied and cured to bond the materials to be bonded.

In this case, however, a problem arises that it requires much time for the drying of a solvent contained in the primer and/or adhesive or curing reaction. There is also a problem that the vaporization of a solvent has adverse effects on the working environment and the global environment.

To solve the above problems, hot-melt adhesives have recently been utilized in industry. Hot-melt adhesives have the merits that they contain almost or completely no solvent, thereby having small adverse effects on the working environment and the global environment, and having only small fire hazard, and that they are in a solid state at ordinary temperatures, thereby making easy the handling. In addition, hot-melt adhesives can be solidified and bonded by standing to cool after melting and bonding, so that they are suitable for automation, acceleration, and mass treatment.

However, the ordinary hot-melt adhesives have a difficulty that they have low bonding strength at high temperatures and they can often exhibit no desired performance. When hot-melt adhesives with high melting points for the purpose of using at high temperatures are used, a heating furnace is needed when bonding, leading to a high production cost for that. Further, the step of cooling after heating and bonding is needed, rendering a difficulty to the practical application.

Thus, there have been made studies to obtain adhesives having the merits and overcoming the defects of hot-melt adhesives as described above. The resin composition for high-frequency bonding according to the present invention is one of the hot-melt adhesives and has the function of bonding materials to be bonded by heating and melting the composition through the application of a high-frequency voltage with the intervention of the composition between the materials to be bonded, and then by cooling for solidification. The use of an adhesive containing the resin composition for high-frequency bonding according to the present invention requires no heating furnace, so that the equipment for the step of bonding can be made easy and simple as compared with the situation where conventional hot-melt adhesives are used.

The principle of high-frequency heat generation utilized in the present invention is considered by heat generation from molecular friction based on the polarization of molecules. In general, the efficiency of heat generation in thermoplastic resins by the application of a high-frequency voltage is considered excellent for higher dielectric constant ($\epsilon$), higher dielectric loss tangent ($\tan\delta$), and higher dielectric loss factor $\{(\epsilon)\times(\tan\delta)\}$ as their product. Therefore, thermoplastic resins composed mainly of hydrocarbon bonds seem to be unsuitable for high-frequency heating because of their small molecular polarizability.

For example, for base materials or films made of a polyester, there has been proposed a method in which a resin layer causing dielectric heat generation, such as phenolic resins or urethane resins, is used as a bonding layer and the base materials or films made of a polyester as the materials to be bonded are connected by dielectric bonding, as disclosed in JP-A 56-75824.

For high-frequency dielectric heat generation, JP-A 52-68273 discloses a technique of blending an inorganic material having a high dielectric loss factor in a thermoplastic resin. JP-A 54-161645 discloses a technique of blending a ferroelectric substance in a thermoplastic resin. JP-A 6-228368 discloses a film prepared by blending or applying an electromagnetic wave absorbing substance such as ferrite to a film made of a thermoplastic resin. JP-A 6-228368 discloses a resin composition prepared by blending a liquid polar material adsorbed inorganic porous powder in a thermoplastic resin. JP-B 5-42982, JP-A 2-129243, and JP-A 2-182419 also disclose resin compositions prepared by blending radio-frequency sensitivity improving inorganic compounds, crystal water containing inorganic compounds, and high polar organic materials, respectively, in thermoplastic resins such as polyolefin resins. ANTEC '91, pp.2245-2247, discloses blending sodium aluminosilicate in ultrahigh molecular weight polyethylene. Microwave sensitizers are commercially available, for example, under FREQUON (trade name) from Struktol Company of America. However, all these techniques have not yet been put into practice because of their low heat generation rate by high-frequency dielectric heating.

For polyester fiber products, methods for obtaining fiber products having a high-frequency fusion property by applying an alkali (earth) metal salt of an acid phosphorus compound or a basic nitrogen-containing compound are disclosed in JP-A 59-15572 or the like. JP-A 59-26576 discloses a method for improving the high-frequency fusion property by applying an emulsion of a high polar polymer such as vinyl chloride or vinylidene chloride to polyester fibers. Polyamide resins have a heat generation property as compared with polyester resins; however, as disclosed in JP-A 62-50122, polyamide resins provide a small temperature difference from materials to be bonded, even by dielectric heating, and therefore, they have insufficient heat generation and bonding properties for putting them into practice as adhesives. As disclosed in JP-A 59 184611, there has been made an attempt to allow the intervention of a metal covered with another adhesive. Further, JP-A 60-130664 discloses a method in which conductive fibers are blended in a polyamide resin and eddy-current loss by high-frequency induction is utilized; however, heat generation rate is low and it requires much time for heating, which is not practical.

SUMMARY OF THE INVENTION

An object of the present invention is to provide a thermoplastic resin composition, which is a hot-melt adhesive composed mainly of a thermoplastic resin with heat resistance, and which can achieve heat bonding for a short time by the high-frequency dielectric heating method, and which can exhibit high bonding strength under a high-temperature atmosphere.

The present inventors have extensively studied to attain the above object, and as a result, they have completed the present invention. Thus, the present invention provides a resin composition for high-frequency bonding with a dielectric loss tangent of 0.03 or higher at a frequency of 40 MHz, comprising a thermoplastic resin having a melting point of 80° C. to 200° C. in an amount of 70% to 99% by volume, based on the total volume of the composition, and a conductive material having a volume resistivity of $10^{-2}$ Ω.cm or lower in an amount of 30% to 1% by volume, based on the total volume of the composition.

In a preferred embodiment, the above thermoplastic resin is a polyolefin resin.

In a preferred embodiment, the above thermoplastic resin is a polyester resin.

In a preferred embodiment, the above thermoplastic resin is a polyamide resin.

In a preferred embodiment, the dielectric loss tangent is 0.05 or higher at a frequency of 40 MHz.

In a preferred embodiment, the above dielectric loss tangent is 0.1 or higher at a frequency of 40 MHz.

In a preferred embodiment, the above conductive material having a volume resistivity of $10^{-2}$ Ω.cm or lower is contained in an amount of 30% to 5% by volume, based on the total volume of the composition.

In a preferred embodiment, the above resin composition for high-frequency bonding exhibits a bonding property by applying a high-frequency voltage to cause heating and melting, and then by cooling for solidification.

DETAILED DESCRIPTION OF THE INVENTION

Figure 1:
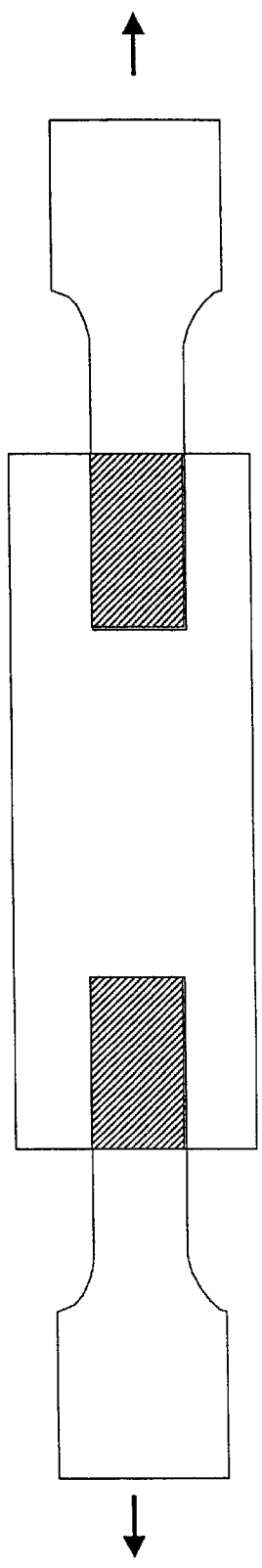
FIG. 1 is a schematic view showing a test piece for the measurement of bonding strength.

The resin composition for high-frequency bonding with a dielectric loss tangent of 0.03 or higher at a frequency of 40 MHz according to the present invention contains a thermoplastic resin having a melting point of 80° C. to 200° C. in an amount of 70% to 99% by volume, based on the total volume of the composition, and a conductive material having a volume resistivity of $10^{-2}$ Ω.cm or lower in an amount of 30% to 1% by volume, based on the total volume of the composition.

The conductive material used in the present invention has a volume resistivity of $10^{-2}$ Ω.cm or lower. The volume resistivity is also called specific resistance, expressing the difficulty of an electric flow through conductive materials, and is calculated by the equation: volume resistivity (Ω.cm)=R×(S/L) from the electrical resistance R (Ω) of a conductive material wire with a length L (cm) and a cross-sectional area S (cm$^2$).

The conductive material used in the present invention may include iron, copper, silver, carbon fibers, and carbon black. Among these are preferred iron-series metals and carbon in that they have only small effects on the deterioration of a bonding resin or from an economical point of view. In particularly, iron-series metals are preferred and may include, but are not particularly limited to, α-iron, β-iron, γ-iron, and carbon steel. These conductive materials may be used alone or may be simultaneously used in any combination.

When the conductive material has a volume resistivity of higher than $10^{-2}$ Ω.cm, heat generation rate by high-frequency dielectric heating is insufficient, and it requires much time for temperature rise to the temperature suitable for bonding, which is not preferred. More preferably, the conductive material may have a volume resistivity of $10^{-4}$ Ω.cm or lower. The amount of conductive material contained is 1% to 30% by volume, preferably 5% to 25% by volume, based on the total volume of the composition. In particular, when the amount of conductive material contained is larger than 5% by volume, the effects of high-frequency dielectric heat generation become remarkably large, which is preferred. When the conductive material is contained in an amount of smaller than 1% by volume, heat generation rate is insufficient, and it requires much time for temperature rise to the temperature suitable for bonding, which is not preferred. When the conductive material is contained in an amount of larger than 30% by volume, the resin composition for bonding has a decreased strength, reducing bonding force, which is not preferred.

Conductive materials have very small phase difference δ between the electric current and the voltage as compared with thermoplastic resins, and therefore, should also have small tan δ. It is a surprising fact that the dielectric loss tangent tan δ of a resin composition becomes very large by the incorporation of a conductive material. This fact is considered to be due to a special effect by a combination.

The conductive material in the resin composition for bonding may be in any form, such as powders, needles, scales, fibers, or nets, and may suitably be selected depending on the kinds of materials to be bonded. In a preferred embodiment, a fine-grain conductive material in powder, needle, or scale form is used by melting and kneading in a thermoplastic resin. When used by kneading, a fine-grain conductive material may desirably have an average grain diameter in the range of 0.1 to 500 μm. In another preferred embodiment, a conductive material in net form is used by laminate molding or insert molding.

The resin composition containing a conductive material in an amount of 1% by volume or larger, particularly 5% by volume or larger, although the reason has not yet been unknown, may become to have large dielectric loss tangent for the application of a high-frequency voltage, and therefore, may become to have a remarkably increased dielectric loss factor as the product of dielectric loss tangent and dielectric constant. In the high-frequency heating, heat generation rate is high for a large dielectric loss factor, and therefore, temperature rising rate becomes high, so that hot-melt adhesives can melt in a short time, leading to the shortening of time in the step of bonding.

In contrast to the induction heating method in which random current or eddy current is generated by electromagnetic induction in an electrically conductive substance as a material to be heated to cause resistive heat generation, the principle of the high-frequency dielectric heating method utilized in the present invention is considered by heat generation from molecular friction based on the polarization of molecules. In general, the efficiency of heat generation in thermoplastic resins by the application of a high-frequency voltage is considered excellent for higher dielectric constant ($\epsilon$), higher dielectric loss tangent (tan$\delta$), and higher dielectric loss factor $\{(\epsilon)\times(\tan\delta)\}$ as their product.

The thermoplastic resin used in the present invention may include polyolefin resins, polyester resins, polyamide resins, polystyrene resins, polyurethane resins, and acrylic resins. In particular, polyolefin resins, polyester resins, and polyamide resins are preferred because of their good heat resistance and chemical resistance. These thermoplastic resins are composed mainly of hydrocarbon bonds, and therefore, they seem to be unsuitable for high-frequency heating because of their small molecular polarizability. However, in the present invention, dielectric loss tangent can be made 0.03 or lower by a resin composition containing a thermoplastic resin as the main ingredient, which is usually difficult to cause heat generation by high-frequency heating, and a conductive material, thereby making it possible to obtain a resin composition for bonding, which can exhibit sufficient heat generation by high-frequency dielectric heating.

As described above, conductive materials have very small phase difference $\delta$ between the electric current and the voltage as compared with thermoplastic resins such as polyester resins and polyamide resins, and therefore, should also have small tan $\delta$. It is a surprising fact that the dielectric loss tangent tan $\delta$ of a resin composition becomes very large by the incorporation of a conductive material. This fact is considered to be due to a special effect by a combination.

The resin composition for high-frequency bonding according to the present invention has a dielectric loss tangent of 0.03 or higher at a frequency of 40 MHz. When the dielectric loss tangent is lower than 0.03, heat generation rate by high-frequency heating is insufficient, and it requires much time in the step of bonding, which is not preferred. More preferably, the resin composition for high-frequency bonding has a dielectric loss tangent of 0.1 or higher at a frequency of 40 MHz. The resin composition for bonding with a dielectric loss tangent of 0.03 or higher at a frequency of 40 MHz can be obtained by blending a conductive material having the above volume resistivity so that the conductive material is contained in the above amount.

The thermoplastic resin having a melting point of 80° C. to 200° C. used in the present invention, although it may be a homopolymer, may preferably be composed mainly of a copolymer from the viewpoint of an improvement in the bonding property. The resin composition for bonding, which has risen its temperature by high-frequency heating, exhibits flowability suitable for bonding at temperatures higher than the melting point of the thermoplastic resin. Therefore, when the melting point is too high, it requires much time for the resin composition to exhibit flowability, which is not preferred. For the bonding of a material to be bonded having low heat resistance, the material to be bonded cannot be used because of its deformation, and therefore, the melting point is preferably 200° C. or lower. In the resin composition for high-frequency bonding according to the present invention, the thermoplastic resin is contained in an amount of 70% to 99% by volume, preferably 75% to 98% by volume, based on the total volume of the composition. When the amount of thermoplastic resin contained is smaller than 70% by volume, flowability at the time of bonding may be decreased or bonding strength may be decreased. When the amount of thermoplastic resin contained is larger than 99%, there is a tendency that heat generation rate by high-frequency dielectric heating becomes too low.

The polyolefin resins used in the present invention refer to resins obtained by the polymerization of unsaturated hydrocarbon monomers such as polyethylene or polypropylene, and may include, but are not limited to, homopolymers or copolymers of olefins such as ethylene, propylene, butene, methylpentene, and hexene, or blends of these homopolymers or copolymers.

When other copolymerizable monomers in addition to the above olefins, such as vinyl acetate, methacrylic acid, acrylic acid, methyl methacrylate, ethyl acrylate, butyl acrylate, and methacrylic acid salts are copolymerized in the range of 3 to 50 mol %, based on the entire polyolefin resin, the bonding property is improved, which is preferred. Amounts of copolymerizable monomers smaller than 3 mol % may have only a small improving effects on the bonding property, while amounts of copolymerizable monomers larger than 50 mol % may cause a loss of the heat resistance of the polyolefin resin.

The polyolefin resins used in the present invention may preferably contain monomers with carboxylic acid groups, carboxylic anhydride groups, epoxy groups, hydroxyl groups, isocyanate groups, silanol groups or the like as copolymerizable monomers or graft polymerizable monomers. Among the above monomers are particularly preferred unsaturated carboxylic acids and glycidyl methacrylate as the copolymerizable monomers and particularly preferred maleic anhydride as the graft polymerizable monomer.

The introduction of the above functional groups into the polyolefin resins used in the present invention can improve the bonding property of the resin composition of the present invention with materials to be bonded.

The polyester resins used in the present invention refer to resins having ester linkages in the molecules. The acid components may include, but are not limited to, terephthalic acid, isophthalic acid, naphthalenedicarboxylic acid, adipic acid, sebacic acid, and dimer acid. The glycol components may include, but are not limited to, ethylene glycol, propylene glycol, butanediol, hexanediol, neopentyl glycol, diethylene glycol, cyclohexanedimethanol, polyethylene glycol, polypropylene glycol, polytetramethylene glycol, and polylactone. In particular, preferred acid components are terephthalic acid, isophthalic acid, adipic acid, and sebacic acid; and preferred glycol components are ethylene glycol, butanediol, and polytetramethylene glycol. The polyester resins may preferably have number average molecular weights of 3000 to 50,000. In particular, copolymerized polyester resins having melting points of 80° C. to 200° C. are preferred. When the melting point is lower than 80° C., heat resistance at the time of use is deteriorated. When the melting point is higher than 200° C., bonding requires high temperatures, prolonging the process time, or materials to be bonded are limited, which is not preferred.

The polyamide resins used in the present invention refer to resins having acid amide linkages (—CONH—) in the molecules. Specific examples are, but not limited to, homopolymers or copolymers obtained from $\epsilon$-caprolactam, 6-aminocapric acid, $\omega$-enantholactam, 7-aminoheptanoic acid, 11-aminoundecanoic acid, 9-aminononanoic acid, $\alpha$-pyrrolidone, $\alpha$-piperidone, or the like; homopolymers or copolymers obtained by polycondensation of diamines (e.g., hexamethylenediamine, nonamethylenediamine, undecamethylenediamine, dodecamethylenediamine, metaxylylenediamine) and dicarboxylic acids (e.g., terephthalic acid, isophthalic acid, adipic acid, sebacic acid); and blends of these homopolymers or copolymers.

Of the above polyamide resins, those having melting points of 80° C. to 200° C. are used. The polyamide resins may preferably have number average molecular weights of 5000 to 50,000. Since the amino terminal groups and carboxyl terminal groups of polyamide resins can react to make a bond with coupling agents or polymers with reactive groups other than polyamide resins, as enhancing agents, it is preferred that the polyamide resins contain amino terminal groups and carboxyl terminal groups in larger amounts. The balance between the amounts of both terminal groups may be changed depending on the kinds and amounts of coupling agents used, or the kinds and amounts of polymers with reactive groups other than polyamide resins.

When materials to be bonded are glass, ceramic, or metals, it is preferred that coupling agents having silanol groups and reactive functional groups at the termini of resins or introduced by modification to improve the bonding property are contained in the polyester resins and/or polyamide resins. Specific examples of the coupling agents are γ-aminopropyltriethoxysilane, β-(3,4-epoxycyclohexyl) ethyltrimethoxysilane, γ-glycidoxypropyltrimethoxysilane, γ-methacryloxypropyltrimethoxysilane, and N-β-(aminoethyl)-γ-aminopropyltrimethoxysilane.

The materials to be bonded, which are used in the present invention, are not particularly limited, but may be any of glass, ceramic, metals, and resins. The resins as the materials to be bonded may be either thermosetting resins or thermoplastic resins. According to the present invention, only bonding layers are selectively heated; therefore, the resin composition for high-frequency bonding according to the present invention can be applied to the cases where thermoplastic resins having relatively low melting points of 200° C. or lower are used as the materials to be bonded. Depending on the kinds of materials to be bonded, the addition of silane or titanium coupling agents to the resin composition, or the introduction of functional groups into the molecular side chains are effective for obtaining high bonding strength and can therefore be suitably carried out.

The resin composition for high-frequency bonding according to the present invention may further contain ordinary additives, anti-hydrolysis agents, and pigments. For example, heat stabilizers and/or antioxidants may include additives of the hindered phenol type, the thioether type, the phosphite type, the phosphate type or other types, or their combined additives; weathering agents and/or light stabilizers may include carbon black and additives of the benzophenone type, the triazole type, the hindered amine type or other types; anti-hydrolysis agents may include compounds such as carbodiimide, bisoxazoline, epoxy, and isocyanate; and pigments may include heat-resistant pigments ordinarily used in thermoplastic resins.

The resin composition for high-frequency bonding provided by the present invention may be used, for example, by the following configuration and method. Under the situation that materials to be bonded are stacked in a configuration such as glass plate/resin composition of the present invention/thermoplastic formed product, glass plate/resin composition of the present invention/glass plate, ceramic plate/resin composition of the present invention/ thermoplastic formed product, thermoplastic formed product/resin composition of the present invention/ thermoplastic formed product, or the like, the materials to be bonded are placed under pressure between the upper electrode and the lower electrode, and a high-frequency voltage is applied to the electrodes from a high-frequency oscillator to cause high-frequency dielectric heating. With the lapse of time, the temperature of the resin composition rises, and when it comes to a temperature higher than the melting point thereof, the resin composition starts to flow and proceeds with bonding. When the bonding is completed, the high-frequency voltage is turned off, and cooling is carried out by standing to cool or cold air to solidify the resin composition, thereby obtaining a bonded assembly.

When a high-frequency voltage is applied to the resin composition for high-frequency bonding according to the present invention, only bonding layers are heated by a high-frequency dielectric heating phenomenon, so that the entire materials to be bonded are not needed to be treated in a furnace; therefore, the resin composition for high-frequency bonding according to the present invention is particularly useful for the bonding of large materials to be bonded. In addition, since only bonding layers are selectively heated, the resin composition for high-frequency bonding according to the present invention is also useful for the assembly of materials to be bonded partly containing parts with low heat resistance.

The structural members assembled by bonding with the resin composition for high-frequency bonding according to the present invention as an adhesive can also be used in the fields, which are required to have high reliability, such as automobiles, electrical appliances, office automation equipments, and building materials.

The structural members assembled by bonding with the resin composition for high-frequency bonding according to the present invention as an adhesive can easily be disassembled, when they become unnecessary, by high-frequency dielectric heating to raise the temperature of bonding layers to the melting point or higher. Even glass, which is fragile by an impact, or even large components can easily be disassembled without a large furnace and the disassembled materials can be recycled, which are the advantages of the present invention.

EXAMPLES

The present invention will be further illustrated by the following Examples; however, the present invention is not limited to these Examples.

(1) Preparation of Pellets of Resin Compositions for Bonding

A thermoplastic resin and a conductive material were premixed at a prescribed blending ratio, and the resulting premix was fed to the hopper of a double-screw extruder (PCM30φ, Ikegai Tekko K.K.), the barrel of which had been temperature controlled in order from the hopper side at 170° C., 180° C., and 180° C., followed by melting and kneading at a screw rotation speed of 60 rpm. The melt was extruded into a strand shape in a water bath and cooled, and then cut to give pellets of a resin composition for bonding containing the conductive material.

(2) Formation of Plates of Resin Compositions for Bonding

Into an injection molding machine (IS80, Toshiba Machine Co., Ltd.), the barrel of which had been temperature controlled in order from the hopper side at 180° C., 200° C., and 200° C., there were put the pellets of the resin composition for bonding prepared in (1), followed by injection molding into a metal mold for test pieces, which had been temperature controlled at 40° C., to give adhesive plates of 100 mm×100 mm×1 mm and 100 mm×100 mm×3 mm.

(3) Formation of Plates of Materials to be Bonded

The pellets of 30 wt % glass fiber reinforced modified polybutylene terephthalate resin (EMC430, Toyo Boseki K.K.), which had been dried at 140° C. for 3 hours, were put into the hopper of the same injection molding machine as described above, the barrel of which had been temperature controlled in order from the hopper side at 250° C., 260° C., and 260° C., to form test pieces for tension test of type I as described in ASTM D638 and test pieces of 12 mm×150 mm×5 mm. In the same manner, test pieces for tension test were formed of 30 wt % glass fiber reinforced polyamide-6 resin (T-402, Toyo Boseki K.K.). In the same manner except that the barrel had been temperature controlled in order from the hopper side at 280° C., 300° C., and 300° C., test pieces for tension test were formed of 40 wt % glass fiber reinforced polyphenylene sulfide resin (TS401, Toyo Boseki K.K.).

(4) Bonding Strength (a) Bonding strength of material to be bonded/resin composition for bonding/glass plate/resin composition for bonding/material to be bonded A plate of a material to be bonded as a test piece for tension test of type I as described in ASTM D638, which had been formed in (3), was cut in the middle along the long direction. On the linear portion of 12.7 mm×25.4 mm was stacked a test piece of a resin composition of 12.7 mm×25.4 mm cut from a plate of the resin composition of 100 mm×100 mm×1 mm, which had been formed in (2). A pair of the stacked pieces are placed on the both ends of a glass plate of 33 mm×100 mm×3 mm so as to sandwich the glass plate in the configuration of the material to be bonded/the resin composition for bonding/the glass plate/the resin composition/the material to be bonded as shown in FIG. 1.

Then, the composite of the material to be bonded, the resin composition for bonding, the glass plate, the resin composition for bonding, and the material to be bonded stacked in this order was subjected to high-frequency dielectric heating with a high-frequency dielectric heating machine (trade name: Impedance Analyzer, Pearl Kogyo Co., Ltd.; terminal area S, 5 cm$^2$) for a prescribed time under a gauge pressure of 2 Kg/cm$^2$ by a 20 mmφ air cylinder, and then cooled by an air blow at room temperature for 1 minute to give a test piece for the evaluation of bonding strength (see FIG. 1).

The above test piece for evaluation was placed in a test chamber controlled at 23° C. under 50% RH for 5 hours or longer, and then set between the upper and lower chucks of a universal tension tester model UTMI with a thermostatic bath temperature controlled at 50° C. (K.K. Orientech), followed by the measurement of bonding strength at 50° C. through tension shear at a deformation rate of 5 mm/min.

Figure 2:
FIG. 2 is a schematic view showing another test piece for the measurement of bonding strength.

(b) Bonding strength of material to be bonded/resin composition for bonding/material to be bonded A test piece of a resin composition of 12 mm×25 mm cut from a plate of the resin composition of 100 mm×100 mm×1 mm, which had been formed in (2), is sandwiched between two plates of a material to be bonded as test pieces for tension test of 12 mm×150 mm×5 mm, which had been formed in (3), as shown in FIG. 2.

Then, the composite of the material to be bonded, the resin composition for bonding, and the material to be bonded was subjected to high-frequency dielectric heating with a high-frequency dielectric heating machine (trade name: Impedance Analyzer, Pearl Kogyo Co., Ltd.; terminal area S, 5 cm$^2$) for a prescribed time under a gauge pressure of 2 Kg/cm$^2$ by a 20 mmφ air cylinder, and then cooled by an air blow at room temperature for 1 minute to give a test piece for the evaluation of bonding strength (see FIG. 2).

The above test piece for evaluation was placed in a test chamber controlled at 23° C. under 50% RH for 5 hours or longer, and then set between the upper and lower chucks of a universal tension tester model UTMI with a thermostatic bath temperature controlled at 50° C. (K.K. Orientech), followed by the measurement of bonding strength at 50° C. through tension shear at a deformation rate of 5 mm/min.

(5) Dielectric Characteristics

A test piece of 8 mm×8 mm cut from the adhesive plate having a thickness Ds of 3 mm prepared in (2) was sandwiched between the conductive terminals having a terminal area S of 5 cm$^2$, which had been connected to a high-frequency power circuit (trade name: Impedance Analyzer, Pearl Kogyo Co., Ltd.). To the test piece was given high-frequency charge Q at a frequency of 40 MHz, and electrostatic capacity Cs and dielectric loss tangent tan δ were measured from the electric potential difference V of the terminals. The dielectric loss factor ε·tanδ was determined by the following equation (1):

$$\epsilon \cdot \tan \delta = Cs \times Ds/(\epsilon_0 \times S) \tag{1}$$

where the electric constant $\epsilon_0 = 8.85 \times 10^{-14}$ F/cm.

(6) Melting Point

The melting point of a thermoplastic resin was measured by the DSC method according to JIS K 7121.

The following conditions for DSC measurement were used: apparatus, DSC3100 available from K.K. MacScience; pan, aluminum pan (non-airtight type); sample weight, 4 mg; initial temperature for temperature rising, room temperature (about 30° C.); temperature rising rate, 20° C./min.; and atmosphere, argon.

Examples 1–11 and Comparative Examples 1–7

The polyolefin resin and the conductive material shown in Tables 1 and 2 were premixed at a blending ratio shown in Tables 1 and 2, and the resulting premix was formed into pellets as described in Example 1 and then into adhesive plates as described in Example 2. The adhesive plate of 3 mm in thickness was used for the measurement of dielectric loss tangent and dielectric loss factor as described in Example 5. A glass plate and a plate of a glass fiber reinforced modified polybutylene terephthalate resin (EMC430) prepared in Example 3 were used as materials to be bonded, and the adhesive plate of 1 mm in thickness was used for bonding by high-frequency dielectric heating for the oscillation time of 1, 5 or 20 minutes, and bonding strength was measured as described in Example 4(a). The results are shown in Tables 1 and 2.

Examples 12–17

The same plate of a resin composition for bonding as described above in Example 3 and in Table 1 was used with a combination of materials to be bonded as shown in Table 3 to give a test piece for evaluation, which was measured for bonding strength as described in Example 4(b). The results are shown in Table 3.

TABLE 1

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Blending amounts (% by volume) | PO-1 | 97.5 | 95 | 92 | 92 | 92 | 92 | | 97.5 | 95 | 92 | 97.5 |
| | PO-2 | | | | | | | 92 | | | | |
| | Fe100 | 2.5 | 5 | 8 | | | | 8 | 2.5 | 5 | 8 | 2.5 |
| | Fe200 | | | | 8 | | | | | | | |
| | Cu100 | | | | | 8 | | | | | | |
| | CF | | | | | | 8 | | | | | |
| Oscillation time | min. | 1 | 1 | 1 | 1 | 1 | 1 | 1 | 5 | 5 | 5 | 20 |
| Dielectric loss tangent | — | 0.032 | 0.055 | 0.24 | 0.26 | 0.22 | 0.19 | 0.31 | 0.032 | 0.055 | 0.24 | 0.24 |
| Dielectric loss factor | cm$^{-1}$ | 1.9 | 3 | 72 | 76 | 48 | 40 | 71 | 1.9 | 3 | 72 | 1.9 |
| Bonding strength | MPa | 1.1 | 3.1 | 4.6 | 4.1 | 3.9 | 5.5 | 5.1 | 1.9 | 6 | 4.5 | 6.8 |

PO-1: silane modified G197 (polyolefin resin composed of polyethylene copolymerized blend, Kureha Elastomer; m.p., 105° C.)
PO-2: silane modified G1019 (polyolefin resin composed of polyethylene copolymerized blend, Kureha Elastomer; m.p., 120° C.)
Fe100: ASC100 (iron powder, Hoganas Japan K. K.; average grain diameter, 100 μm; volume resistivity, 1.4 × 10$^{-5}$ Ω · cm)
Fe200: KIP300 (iron powder, Kawasaki Steel Corporation; average grain diameter, 200 μm; volume resistivity, 1.6 × 10$^{-6}$ Ω · cm)
Cu100: CE-6 (copper powder, Fukuda Metal Foil Powder Co., Ltd.; average grain diameter, 100 μm; volume resistivity, 1.7 × 10$^{-6}$ Ω · cm)
CF: HTA (carbon fiber, Toho Rayon Co., Ltd.; fiber length, 3 mm; volume resistivity, 1.5 × 10$^{-3}$ Ω · cm)

TABLE 2

| | | Comparative Examples | | | | | | |
|---|---|---|---|---|---|---|---|---|
| | | 1 | 2 | 3 | 4 | 5 | 6 | 7 |
| Blending amounts (% by volume) | PO-1 | 100 | 100 | 99.5 | 65 | | | 92 |
| | PO-2 | | | | | | | |
| | PO-3 | | | | | 95 | | |
| | PO-4 | | | | | | 92 | |
| | Fe100 | | | 0.5 | 35 | | 8 | |
| | Fe200 | | | | | | | |
| | Cu100 | | | | | | | |
| | CF | | | | | | | |
| | SGF05 | | | | | | | 8 |
| Oscillation time | min. | 1 | 20 | 20 | 1 | 1 | 1 | 1 |
| Dielectric loss tangent | — | 0.027 | 0.027 | 0.029 | 0.16 | 0.22 | 0.25 | 0.026 |
| Dielectric loss factor | cm$^{-1}$ | 1.4 | 1.4 | 1.6 | 55 | 69 | 74 | 1.4 |
| Bonding strength | MPa | 0 | 0 | 0 | 0.2 | 0.9 | 0.6 | 0 |

PO-1, PO-2, Fe100, Fe200, Cu100, and CF are as defined in the footnote of Table 1.
PO-3: EVAFLEX-EEA A709 (polyolefin resin composed of ethylene-ethyl acrylate resin, DuPont-Mitsui Polychemicals Co., Ltd.; m.p., 56° C.)
PO-4: TPX (polyolefin resin composed of polymethylpetene, Mitsui Chemicals, Inc.; m.p., 265° C.)
SGF05: milled fibers, Nitto Boseki Co., Ltd.; volume resistivity, 1 × 10$^{-12}$ Ω · cm

TABLE 3

| | | Examples | | | | | |
|---|---|---|---|---|---|---|---|
| | | 12 | 13 | 14 | 15 | 16 | 17 |
| Materials to be bonded | upper side | EMC430 | glass plate | EMC430 | EMC430 | GF-reinforced PA6 plate | GF-reinforced PPS plate |
| | lower side | EMC430 | glass plate | ceramic plate | aluminum plate | glass plate | glass plate |
| Oscillation time | min. | 1 | 1 | 1 | 1 | 1 | 1 |
| Dielectric characteristics | dielectric loss tangent (−) | 0.24 | 0.24 | 0.24 | 0.24 | 0.24 | 0.24 |
| | dielectric loss factor (cm$^{-1}$) | 72 | 72 | 72 | 72 | 72 | 72 |

TABLE 3-continued

| | | Examples | | | | | |
|---|---|---|---|---|---|---|---|
| | | 12 | 13 | 14 | 15 | 16 | 17 |
| Results of evaluation | bonding strength (MPa) | 6.9 | 5.7 | 4.4 | 5.2 | 4.1 | 5.5 |

EMC430: a plate formed of Toyobo EMC430 (glass fiber reinforced modified polybutylene terephthalate resin, Toyo Boseki K. K.)
GF-reinforced PA6 plate: a plate formed of Toyobo nylon T-402 (glass-fiber reinforced polyamide-6 resin, Toyo Boseki K. K.)
GF-reinforced PPS plate: a plate formed of Toyobo PPS TS401 (glass-fiber reinforced polyphenylene sulfide resin, Toyo Boseki K. K.)
ceramic plate: a ceramic plate for electromagnetic cooking devices (Toshiba Ceramics Co., Ltd.)
aluminum plate: an aluminum plate for sashes (Furukawa Aluminum Kogyo K. K.)

Examples 18–30 and Comparative Examples 8–13

The polyester resin or the polyamide resin and the conductive material shown in Tables 4 and 5 were premixed at a blending ratio shown in Tables 4 and 5, and the resulting premix was formed into pellets as described in Example 1 and then into adhesive plates as described in Example 2. The adhesive plate of 3 mm in thickness was used for the measurement of dielectric loss tangent and dielectric loss factor as described in Example 5. A glass plate and a plate of a glass fiber reinforced modified polybutylene terephthalate resin (EMC430) prepared in Example 3 were used as materials to be bonded, and the adhesive plate of 1 mm in thickness was used for bonding by high-frequency dielectric heating for the oscillation time of 1, 5 or 20 minutes, and bonding strength was measured as described in Example 4(a). The results are shown in Tables 4 and 5.

Examples 31–36

The same plate of a resin composition for bonding as described above in Example 20 and in Table 4 was used with a combination of materials to be bonded as shown in Table 6 to give a test piece for evaluation, which was measured for bonding strength as described in Example 4(b). The results are shown in Table 6.

TABLE 5

| | | Comparative Examples | | | | | |
|---|---|---|---|---|---|---|---|
| | | 8 | 9 | 10 | 11 | 12 | 13 |
| Blending amounts (% by volume) | PES-1 | 100 | 100 | 99.5 | 65 | | |
| | PA-2 | | | | | 100 | 100 |
| | Fe100 | | | 0.5 | 35 | | |
| | Fe200 | | | | | | |
| | Cu100 | | | | | | |
| | CF | | | | | | |
| Oscillation time | min. | 1 | 20 | 20 | 1 | 1 | 20 |
| Dielectric loss tangent | — | 0.023 | 0.023 | 0.031 | 0.22 | 0.041 | 0.041 |
| Dielectric loss factor | $cm^{-1}$ | 1.6 | 1.6 | 1.9 | 53 | 2.2 | 2.2 |
| Bonding strength | MPa | 0 | 0 | 0 | 0.3 | 0 | 0.7 |

PES-1, PA2, Fe100, Fe200, Cu100, and CF are as defined in the footnote of Table 4.

TABLE 4

| | | Examples | | | | | | | | | | | | |
|---|---|---|---|---|---|---|---|---|---|---|---|---|---|
| | | 18 | 19 | 20 | 21 | 22 | 23 | 24 | 25 | 26 | 27 | 28 | 29 | 30 |
| Blending amounts (% by volume) | PES-1 | 97.5 | 95 | 92 | 92 | 92 | 92 | | | | | | 97.5 | |
| | PA-1 | | | | | | | 97.5 | 95 | 92 | 92 | 92 | | 97.5 |
| | Fe100 | 2.5 | 5 | 8 | | | | 2.5 | 5 | 8 | | | 2.5 | 2.5 |
| | Fe200 | | | | 8 | | | | | | | | | |
| | Cu100 | | | | | 8 | | | | | 8 | | | |
| | CF | | | | | | 8 | | | | | 8 | | |
| Oscillation time | min. | 1 | 1 | 1 | 1 | 1 | 1 | 1 | 1 | 1 | 1 | 1 | 5 | 5 |
| Dielectric loss tangent | — | 0.078 | 0.12 | 0.28 | 0.27 | 0.21 | 0.24 | 0.82 | 0.17 | 0.32 | 0.24 | 0.23 | 0.078 | 0.82 |
| Dielectric loss factor | $cm^{-1}$ | 2.1 | 3.4 | 74 | 79 | 52 | 44 | 2.7 | 5.1 | 69 | 55 | 49 | 2.1 | 2.7 |
| Bonding strength | MPa | 1.3 | 3.2 | 4.6 | 4.5 | 4.1 | 4.6 | 1.9 | 3.6 | 4.6 | 4.2 | 4.4 | 3.2 | 3.0 |

PES-1: modified GM400 (copolymerized polyester resin, Toyo Boseki K. K.; m.p., 143° C.)
PA-1: modified MELTLON PA (modified polyamide resin, Diabond Industry Co., Ltd.; m.p., 110° C.)
Fe100: ASC100 (iron powder, Hoganas Japan K. K.; average grain diameter, 100 μm; volume resistivity, $1.4 \times 10^{-5}$ Ω · cm)
Fe200: KIP300 (iron powder, Kawasaki Steel Corporation; average grain diameter, 200 μm; volume resistivity, $1.6 \times 10^{-6}$ Ω · cm)
Cu100: CE-6 (copper powder, Fukuda Metal Foil Powder Co., Ltd.; average grain diameter, 100 μm; volume resistivity, $1.7 \times 10^{-6}$ Ω · cm)
CF: HTA (carbon fibers, Toho Rayon Co., Ltd.; fiber length, 3 mm; volume resistivity, $1.5 \times 10^{-3}$ Ω · cm)

TABLE 6

| | | Examples | | | | | |
|---|---|---|---|---|---|---|---|
| | | 31 | 32 | 33 | 34 | 35 | 36 |
| Materials to be bonded | upper side | EMC430 | glass plate | EMC430 | EMC430 | GF-reinforced PA6 plate | GF-reinforced PPS plate |
| | lower side | EMC430 | glass plate | ceramic plate | aluminum plate | glass plate | glass plate |
| Oscillation time | min. | 1 | 1 | 1 | 1 | 1 | 1 |
| Dielectric characteristics | dielectric loss tangent (–) | 0.28 | 0.28 | 0.28 | 0.28 | 0.28 | 0.28 |
| | dielectric loss factor ($cm^{-1}$) | 74 | 74 | 74 | 74 | 74 | 74 |
| Results of evaluation | bonding strength (MPa) | 5.3 | 4.7 | 4.1 | 4.6 | 4.2 | 3.8 |

EMC430: a plate formed of Toyobo EMC430 (glass fiber reinforced modified polybutylene terephthalate resin, Toyo Boseki K. K.)
GF-reinforced PA6 plate: a plate formed of Toyobo nylon T-402 (glass-fiber reinforced polyamide-6 resin, Toyo Boseki K. K.)
GF-reinforced PPS plate: a plate formed of Toyobo PPS TS401 (glass-fiber reinforced polyphenylene sulfide resin, Toyo Boseki K. K.)
ceramic plate: a ceramic plate for electromagnetic cooking devices (Toshiba Ceramics Co., Ltd.)
aluminum plate: an aluminum plate for sashes (Furukawa Aluminum Kogyo K. K.)

EFFECTS OF THE INVENTION

The use of a resin composition for high-frequency bonding according to the present invention makes possible the bonding of various materials to be bonded by high-frequency dielectric heating for a short time. It is also suitable for the bonding of large materials to be bonded because of no need to use a heating furnace. The resin composition composed mainly of thermoplastic resins with high chemical resistance and high heat resistance can also be applied to the bonding assembly in the fields which are required to have high reliability.

What is claimed is:

1. A resin composition for high-frequency bonding with a dielectric loss tangent of 0.03 or higher at a frequency of 40 MHz, comprising a thermoplastic resin having a melting point of 80° C. to 200° C. in an amount of 70% to 99% by volume, based on the total volume of the composition, and a conductive material having a volume resistivity of $10^{-2}$ Ω.cm or lower in an amount of 30% to 1% by volume, based on the total volume of the composition.

2. The resin composition for high-frequency bonding according to claim 1, wherein the thermoplastic resin is a polyolefin resin.

3. The resin composition for high-frequency bonding according to claim 1, wherein the thermoplastic resin is a polyester resin.

4. The resin composition for high-frequency bonding according to claim 1, wherein the thermoplastic resin is a polyamide resin.

5. The resin composition for high-frequency bonding according to claim 1, wherein the dielectric loss tangent is 0.05 or higher at a frequency of 40 MHz.

6. The resin composition for high-frequency bonding according to claim 1, wherein the dielectric loss tangent is 0.1 or higher at a frequency of 40 MHz.

7. The resin composition for high-frequency bonding according to claim 1, wherein the conductive material having a volume resistivity of $10^{-2}$ Ω.cm or lower is contained in an amount of 30% to 5% by volume, based on the total volume of the composition.

8. The resin composition for high-frequency bonding according to claim 1, which exhibits a bonding property by applying a high-frequency voltage to cause heating and melting, and then by cooling for solidification.

* * * * *